May 7, 1957  K. N. THOMPSON  2,791,494
DILUTION TANK
Original Filed Feb. 29, 1952
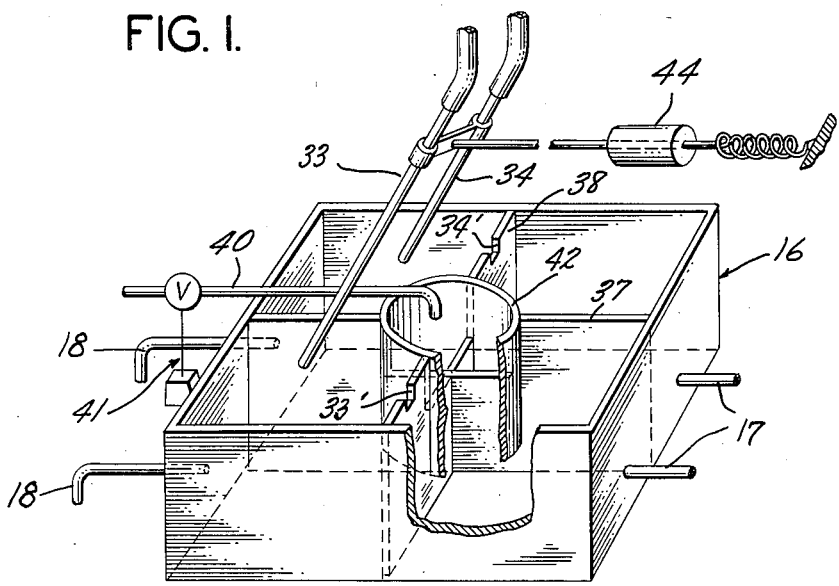
FIG. I.
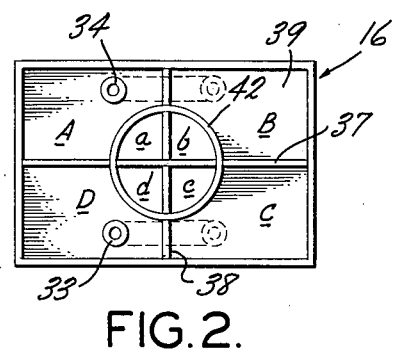
FIG. 2.
INVENTOR.
KEVIN N. THOMPSON
BY
his ATTORNEYS 400; United States Patent Office 2,791,494
Patented May 7, 1957

2,791,494
DILUTION TANK

Kevin N. Thompson, Baldwin, N. Y., assignor to The Standard Oil Company, Cleveland, Ohio, a corporation of Ohio Original application February 29, 1952, Serial No. 274,117, now Patent No. 2,715,610, dated August 16, 1955. Divided and this application January 11, 1954, Serial No. 403,108

2 Claims. (Cl. 23—267)

The invention relates to tank constructions and more particularly to dilution tanks useful, for example, in water softening systems in which treating chemicals such as soda ash and lime are mixed with water.

In the pending application Serial No. 274,117 filed February 29, 1952, now Patent Number 2,715,610, of which this application is a division, there is disclosed a water softening system by means of which treating chemicals are introduced into the water in precisely controlled amounts. Such system is particularly useful in cases in which two or more water softener tanks are furnished with treating chemicals from single sources. The present invention is concerned with a multiple compartment dilution tank structure by means of which the single sources of treating chemicals may be made into aqueous slurries and continuously flowed to the appropriate water softener tanks.

In accordance with the invention a single source of water and single sources of lime and soda ash may be introduced more or less continuously into one tank structure to form the slurries which may be continuously pumped to the softener tanks. The dilution tank preferably includes a series of pairs of compartments corresponding in number to the number of softener tanks utilized in the system, and a central or common compartment communicating with each of these compartments by means of which the single source of water for the slurries may find its way as needed into the respective chemical compartments.

The invention may be better understood by reference to the accompanying drawing, in which—

Figure 1 is a view in perspective of a dilution tank formed in accordance with the present invention; and Figure 2 is a top view of the dilution tank shown in Figure 1.

In accordance with the disclosure of the said pending application, Serial No. 274,117, water treating chemicals, such for example as lime and soda ash are conveyed from suitable sources through nozzles 33 and 34, respectively, to discharge into a dilution tank 16, from which they are conveyed by discharge conduits 17 and 18 to suitable treating tanks. The nozzles 33 and 34 are hingedly supported so that they may be swung back and forth as one by proportional controller means 44 to discharge into the appropriate compartments of the dilution tank 16.

The dilution tank 16 is divided into four primary compartments A, B, C and D, by means of transverse mutually perpendicular partitions 37 and 38, with the partition 38 being formed with notches 33' and 34' to permit the nozzles 33 and 34 respectively, to swing between their extreme positions. The compartments separate the respective soda ash and lime slurries thereby precluding the formation of insoluble calcium carbonate in the system. The discharge member 33, which conveys a slurry of slaked lime, is adapted to be displaced to discharge selectively into compartments D and C, while the discharge member 34 is adapted to be directed to discharge selectively into compartments A and B.

Dilution water for making up the required volume of aqueous slurries or solutions of soda ash and slaked lime is injected in the dilution tank through a common inlet pipe 40 having a float controlled valve assembly 41 to maintain a constant liquid level within the tank. The constant liquid level maintained within the tank permits the total volume of chemical solution pumped to be held constant even through its strength may be varied to suit the water treating requirements. The inlet pipe 40 discharges into a central area in the dilution tank formed by a cylindrical wall 42, the axis of which is substantially coincident with the axis of intersection of the mutually perpendicular partitions 37 and 38. The partitions 37 and 38 within the cylindrical wall 42 form four inner or sub-compartments $a$, $b$, $c$ and $d$, carved out of the compartments A, B, C and D, respectively.

The partitions 37 and 38 are cut away within the cylindrical wall 42 at the upper end thereof and the lower end of the cylindrical wall terminates at a point spaced from the bottom 39 of the tank 16 so that communication is established between the respective compartments and sub-compartments A—$a$, B—$b$, C—$c$, and D—$d$.

The discharge conduits 18 carry the soda ash and lime slurries from compartments A and D, respectively, to an appropriate water softener or other treating tank, and the discharge conduits 17 carry the separate soda ash and lime slurries from the compartment B and C to a second tank.

By means of the dilution tank arrangement described above it will be seen that a single source of water may be used to dilute or form several separate chemical slurries or solutions within a single compartmented tank. While a preferred tank construction has been illustrated and described it will be apparent that the design may be modified in certain minor respects without departing from the scope of the invention, which should not, therefore, be regarded as limited except as defined by the following claims.

I claim:

1. A chemical dilution tank comprising a container, partition means disposed within said container to define a plurality of individual, laterally spaced tank compartments therein, wall means disposed within the tank to form a laterally closed area including a portion of each of said tank compartments to form a corresponding plurality of laterally spaced inner compartments, said wall means being provided with a plurality of openings in the lower portion thereof joining corresponding tank compartments and inner compartments, means to introduce liquid to be diluted into said tank compartments, means to introduce diluting liquid into said laterally closed area to flow into each of said inner compartments through said openings, and outlet means for withdrawing the diluted mixture from each of said tank compartments at points spaced from said openings which join corresponding inner and tank compartments.

2. A chemical dilution tank comprising a container, intersecting partitions disposed within said container to define at least four individual tank compartments therein, inner wall means disposed within the tank to encompass the line of intersection of said partitions to form a laterally closed area within the tank including a portion of each of said tank compartments, the intersecting partitions disposed within said inner area defining at least four inner compartments, said inner wall means terminating above the bottoms of the individual tank compartments to define openings joining corresponding inner and tank compartments, said partitions within the wall means being disposed below the upper edge of the wall means, thereby to form an upper area common to all inner compartments, means to introduce liquid to be diluted into said tank compartments, means to introduce diluting liquid into said laterally closed area to flow into each of said inner compartments through said openings, and outlet means for withdrawing the diluted mixture from each of said tank compartments at points spaced from said openings which join corresponding inner and tank compartments.

References Cited in the file of this patent

UNITED STATES PATENTS

| Number | Name | Date |
|---|---|---|
| 70,439 | Jones | Nov. 5, 1867 |
| 831,059 | Greth | Sept. 18, 1906 |
| 1,686,078 | Evans | Oct. 2, 1928 |
| 2,152,956 | Etzkorn | Apr. 4, 1939 |
| 2,483,648 | Knight | Oct. 4, 1949 |
| 2,570,375 | Pritchard | Oct. 9, 1951 |
| 2,599,782 | Rodriguez | June 10, 1952 |
| 2,649,203 | Hannibal | Aug. 18, 1953 |